(12) United States Patent
Hiltgen

(10) Patent No.: US 11,347,411 B2
(45) Date of Patent: May 31, 2022

(54) SECURE STORING AND PROCESSING OF DATA

(71) Applicant: UBS Business Solutions AG, Zurich (CH)

(72) Inventor: Alain Hiltgen, Birmensdorf (CH)

(73) Assignee: UBS Business Solutions AG, Zurich (CH)

( * ) Notice: Subject to any disclaimer, the term of this patent is extended or adjusted under 35 U.S.C. 154(b) by 364 days.

(21) Appl. No.: 16/514,499

(22) Filed: Jul. 17, 2019

(65) Prior Publication Data

US 2021/0019061 A1   Jan. 21, 2021

(51) Int. Cl.
*G06F 3/06* (2006.01)
*G06F 21/57* (2013.01)
*H04W 12/06* (2021.01)

(52) U.S. Cl.
CPC .......... *G06F 3/0622* (2013.01); *G06F 3/0632* (2013.01); *G06F 3/0673* (2013.01); *G06F 21/575* (2013.01); *H04W 12/06* (2013.01); *G06F 2221/034* (2013.01)

(58) Field of Classification Search
CPC .... G06F 3/0622; G06F 3/0632; G06F 3/0673; G06F 21/575; G06F 2221/034; G06F 21/78; G06F 21/43; G06F 21/35; H04W 12/06; H04L 63/0853
See application file for complete search history.

(56) References Cited

U.S. PATENT DOCUMENTS

| | | | |
|---|---|---|---|
| 9,154,477 B2 | 10/2015 | Cambridge et al. | |
| 9,165,129 B2 | 10/2015 | Smith | |
| 9,665,704 B2 | 5/2017 | Beatson et al. | |
| 9,710,634 B2 | 7/2017 | Fort et al. | |

(Continued)

FOREIGN PATENT DOCUMENTS

TW       201007494 A       2/2012

OTHER PUBLICATIONS

Sahita, Ravi, et al., "Protecting Critical Applications on Mobile Platforms," Intel Technology Journal, Jun. 2009, pp. 16-35, vol. 13 Issue 2.
Msgna, Mehari G., et al., "Secure Application Execution in Mobile Devices," https://www.researchgate.net/publication/290437133, Nov. 2015.

(Continued)

*Primary Examiner* — Mohammad W Reza
(74) *Attorney, Agent, or Firm* — Pillsbury Winthrop Shaw Pittman LLP

(57) ABSTRACT

In some embodiments, inputs provided to an application are securely stored and processed. In some embodiments, input data is obtained via a user interface of an application accessed on a network device and the input data is stored in a physical memory area of temporary storage of the network device. The physical memory area of the temporary storage is configured to be designated for securely storing data processed by the application and to remain designated for securely storing data processed by the application when the network device is rebooted. The physical memory area is inaccessible to other applications. The input data is processed via the physical memory area of the temporary storage in accordance with instructions of the application, and, in response to a reboot of the network device, the designation of the physical memory area of the temporary storage to securely store data processed by the application is reapplied.

20 Claims, 9 Drawing Sheets

(56) References Cited

U.S. PATENT DOCUMENTS

| | | | |
|---|---|---|---|
| 9,961,048 B2 | 5/2018 | Poffenbarger | |
| 2007/0179904 A1* | 8/2007 | Hofstee | G06Q 20/3674 |
| | | | 705/67 |
| 2007/0245148 A1 | 10/2007 | Buer | |
| 2008/0298581 A1* | 12/2008 | Murase | G06F 21/52 |
| | | | 380/44 |
| 2010/0281273 A1* | 11/2010 | Lee | F04B 33/00 |
| | | | 713/190 |
| 2012/0036299 A1 | 2/2012 | Renno | |
| 2012/0240204 A1 | 9/2012 | Bhatagnar et al. | |
| 2016/0191244 A1 | 6/2016 | Claes | |
| 2017/0048232 A1 | 2/2017 | Anantha et al. | |
| 2017/0185787 A1 | 6/2017 | Momchilov et al. | |
| 2019/0318127 A1* | 10/2019 | Pan | G06F 21/60 |

OTHER PUBLICATIONS

Trustonic, "Trustonic Application Protection | Delivering a secure user interface," https://www.trustonic.com/solutions/trustonic-application-protection-tap/, Dec. 24, 2018.

Tong, Tianhao, et al., "GuarDroid: A Trusted Path for Password Entry," In Mobile Security Technologies (MoST), San Francisco, May 2013.

Cheng Y., Ding X., "Virtualization Based Password Protection against Malware in Untrusted Operating Systems," In: Katzenbeisser S., Weippl E., Camp L.J., Volkamer M., Reiter M., Zhang X. (eds) Trust and Trustworthy Computing. Trust 2012. Lecture Notes in Computer Science, vol. 7344. Springer, Berlin, Heidelberg.

European Patent Office Extended European Search Report dated Nov. 17, 2020 in related European Patent Application Serial No. 20186083.0.

* cited by examiner

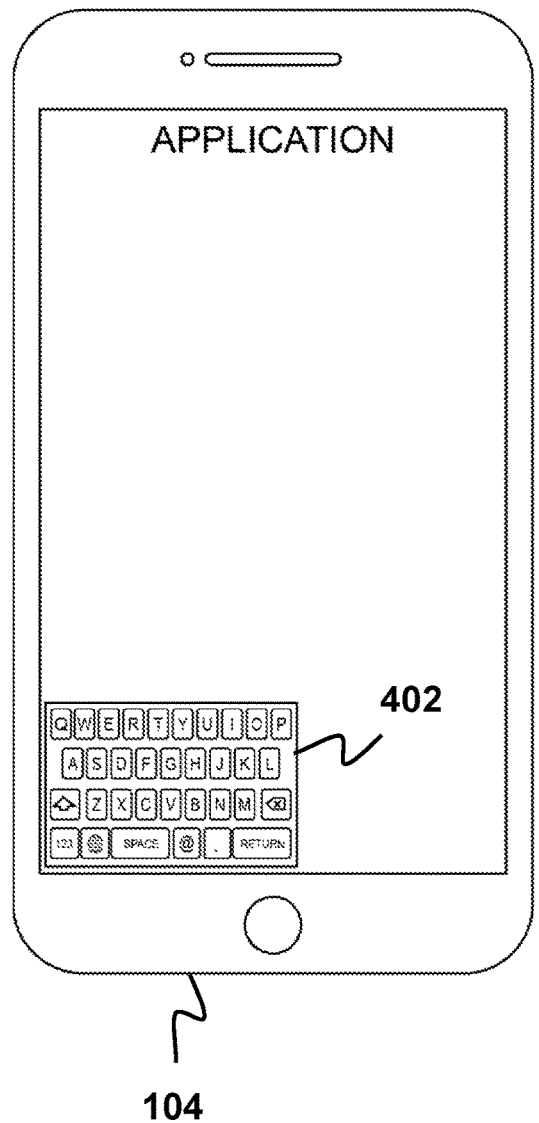
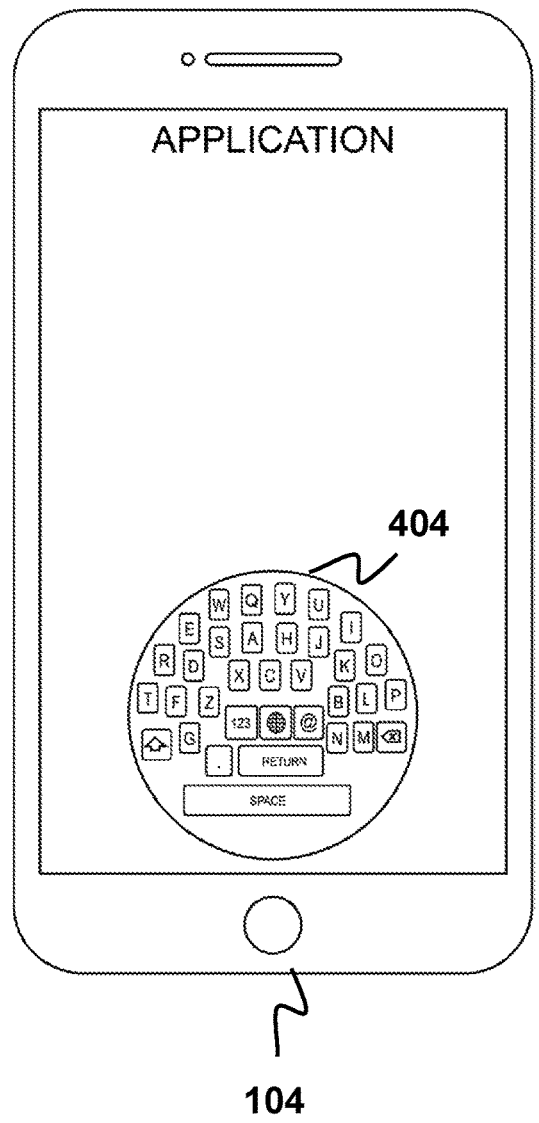
FIG. 4A     FIG. 4B

SECURE STORING AND PROCESSING OF DATA

FIELD OF THE INVENTION

The invention relates to secure storing or processing of data, for example, storing or processing data via hardware-separated environment.

SUMMARY OF THE INVENTION

Aspects of the invention relate to methods, apparatuses, and/or systems for secure storing or processing of data via a hardware-separated environment.

One aspect of the disclosure relates to method for securely storing and processing inputs provided to an application, the method implemented by one or more processors executing computer program instructions that, when executed, perform the method. The method may include obtaining input data via a user interface of an authentication application accessed on a mobile device. The method may further include storing the input data in a physical memory area of temporary storage of the mobile device, the physical memory area of the temporary storage being configured to be designated for securely storing data processed by the authentication application and to remain designated for securely storing data processed by the authentication application when the mobile device is rebooted, the physical memory area being inaccessible to other applications executing on the mobile device. The method may further include processing the input data via the physical memory area of the temporary storage in accordance with instructions of the authentication application and in response to a reboot of the mobile device, reapplying the designation of the physical memory area of the temporary storage to securely store data processed by the authentication application.

Another aspect of the disclosure relates to a system for securely storing and processing inputs provided to an application. The system may obtain input data via a user interface of an authentication application accessed on a mobile device. The system may further store the input data in a physical memory area of temporary storage of the mobile device, the physical memory area of the temporary storage being configured to be designated for securely storing data processed by the authentication application and to remain designated for securely storing data processed by the authentication application when the mobile device is rebooted, the physical memory area being inaccessible to other applications executing on the mobile device. The system may further process the input data via the physical memory area of the temporary storage in accordance with instructions of the authentication application.

Another aspect of the disclosure relates to non-transitory computer readable media. The computer readable media may store computer program instructions that, when executed by a computer system, may cause the computer system to obtain input data via a user interface of an authentication application accessed on a mobile device, store the input data in a physical memory area of temporary storage of the mobile device, the physical memory area of the temporary storage being configured to be designated for securely storing data processed by the authentication application and to remain designated for securely storing data processed by the authentication application when the mobile device is rebooted, the physical memory area being inaccessible to other applications executing on the mobile device, and process the input data via the physical memory area of the temporary storage in accordance with instructions of the authentication application.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIGS. 4A-4D illustrate a plurality of keyboard layouts, in accordance with one or more embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are illustrated in block diagram form in order to avoid unnecessarily obscuring the embodiments of the invention.

Figure 1:
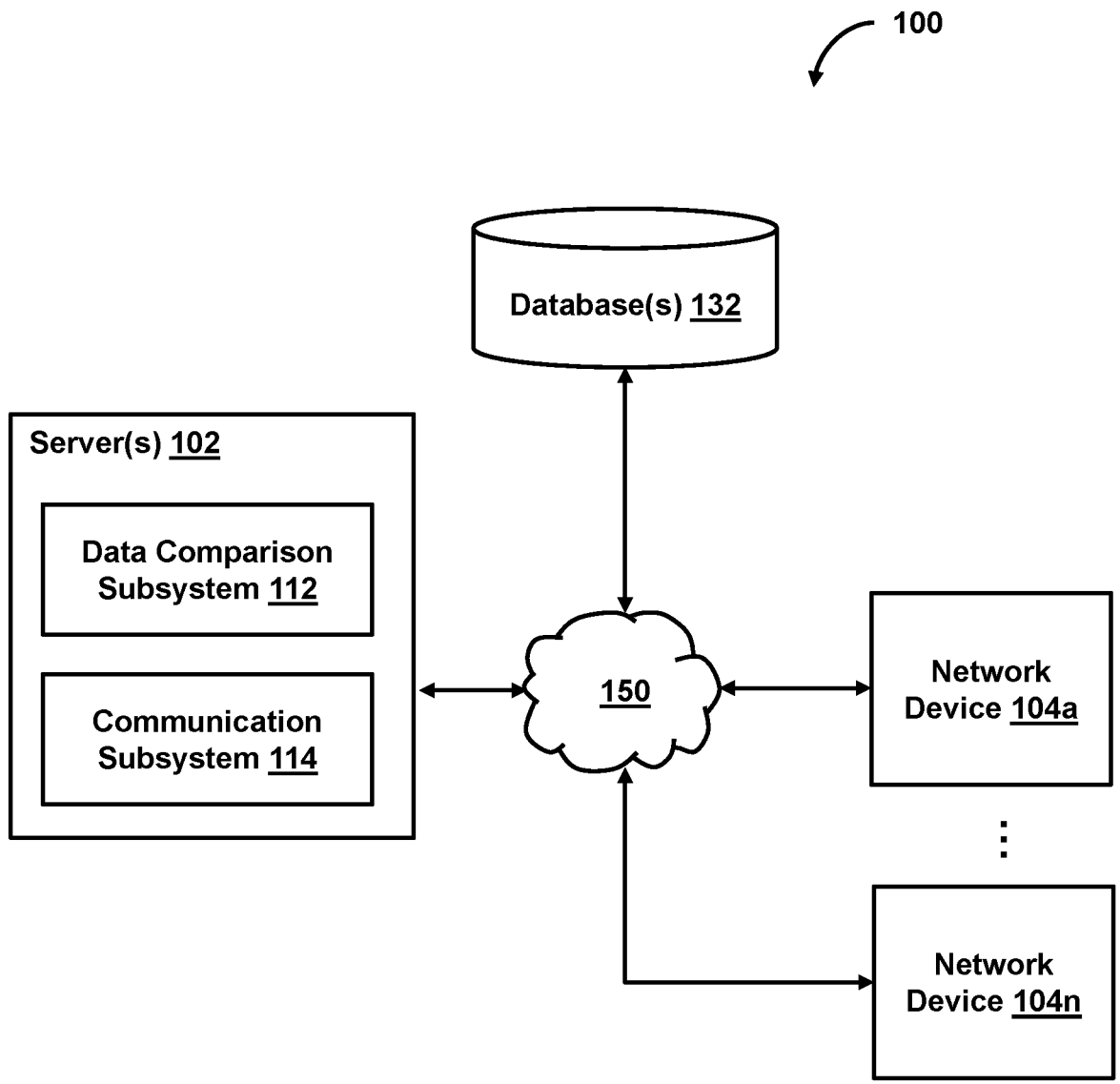
FIG. 1 illustrates a system for securely storing or processing data, in accordance with one or more embodiments.

FIG. 1 illustrates a system 100 for securely accessing, storing, and processing data. As illustrated in FIG. 1, system 100 may include server(s) 102, network device 104 (or network devices 104a-104n), database 132, network 150, or other components. Server 102 may include a data comparison subsystem 112, a communication subsystem 114, or other components. Each network device 104 may include any type of mobile terminal, fixed terminal, or other device. By way of example, network device 104 may include a desktop computer, a notebook computer, a tablet computer, a smartphone, a wearable device, a server, a mobile device, or other network device. Users may, for instance, utilize one or more network devices 104 to interact with one another, one or more servers, or other components of system 100. It should be noted that, while one or more operations are described herein as being performed by particular components of network device 104, those operations may, in some embodiments, be performed by other components of network device 104 or other components of system 100. As an example, while one or more operations are described herein as being performed by components of network device 104, those operations may, in some embodiments, be performed by components of other network devices 104 or server 102. Further, although the database 132 is illustrated as being separate from the server 102 and the network device 104, the database 132 may be located within the network device 104 or server 102.

In order to protect data from being hacked or compromised, several security measures may be implemented. In some embodiments, multiple network devices 104 may be utilized in a first use case. For example, a first application may be accessed on a first network device 104 and identification information (for example, username, email address, numerical identification, etc.) may be input via a user interface of the first application. The first network device 104 may be in direct communication with the server 102. The identification information may be communicated by the first network device 104 to the server 102 via the network 150. In response to the received identification information, the server 102 may generate a message and this message may be either communicated directly to the first network device 104 or to a second network device 104. In one scenario where the message is directly communicated to the first network device 104, the server 102 may also communicate a first code (for example, a challenge code such as a QR code) to the first communication device 104. The first code may be displayed via the user interface of the first application accessed on the first network device 104 so as to allow the second network device 104 to scan the first code in order to be able to access the message (which was sent by the server 102). The message may include a request for authentication. In response to scanning the first code (for example, a QR code) via the second network device 104, a user (of the second network device 104) may be prompted to enter a pin (a first factor authentication) or other credential data (for example, a password, a pattern lock, biometric data (for example, fingerprint data, facial data, iris data)) via a second application accessed on the second network device 104 (controlling access to a digital authenticator previously registered with the server 102). In some embodiments, a predetermined number of attempts may be allowed for entering the pin (or other credential data) via the second network device 104 before automatically locking the second application. In response to entering the correct pin (or other credential data), a confirmation message (indicating possibly via a response code that the user has confirmed his/her identity) may be directly sent by the second network device 104 to the server 102 via the network 150. Alternatively, a second code (for example, a challenge response security code) may be generated and displayed by the second application accessed on the second network device 104, and this second code (a second factor authentication, which is recognized by the server 102, e.g. as a valid response generated with a previously registered digital authenticator) may be manually entered into the first application accessed on the first network device 104 and the second code may be communicated by the first network device 104 to the server 102. In response to receiving the recognized second code from the first network device 104 or the confirmation message from the second network device 104, the server 102 may authenticate a user, authorize (or causing other services to authorize) access (for example, access to the first network device 104, access to network resources on a secure network, including access to email accounts, bank accounts, document repositories, network attached storage devices, and various other network-accessible services accessible on a secure network, access to the first application via which the identification information is received, or access to another application accessed on one or more network devices 104 (for example, different from the first network device 104 via which the identification information was obtained or the same first network device 104 via which the identification information was obtained)), or approve a user's initiated action (for example, initiated action to change contact data, pin or password, payment data, etc.).

In another scenario where the message is directly communicated by the server 102 to the second network device 104 (for example, in response to the server 102 receiving the identification information from the first network device 104), such a message may trigger the second application to be accessed on the second network device 104. For instance, a user (of the second network device 104) may be prompted to enter a pin (a first factor authentication) or other credential data (for example, a password, a pattern lock, biometric data (for example, fingerprint data, facial data, iris data)) via the second application accessed on the second network device 104 (controlling access to a digital authenticator previously registered with the server 102). In some embodiments, a predetermined number of attempts may be allowed for entering the pin (or other credential data) via the second network device 104 before automatically locking the second application. In response to entering the correct pin (or other credential data), a confirmation message (indicating possibly via a response code that the user has confirmed his/her identity) may be directly sent by the second network device 104 to the server 102 via the network 150. Alternatively, a second code (for example, a challenge response security code) may be generated by the second application accessed on the second network device 104, and this second code (a second factor authentication, which is recognized by the server 102, e.g. as a valid response generated with a previously registered digital authenticator) may be manually entered into the first application accessed on the first network device 104 and the second code may be communicated by the first network device 104 to the server 102. In response to receiving the recognized second code from the first network device 104 or the confirmation message from the second network device 104, the server 102 may authenticate a user, authorize (or causing other services to authorize) access (for example, access to the first network device 104, access to network resources on a secure network, including access to email accounts, bank accounts, document repositories, network attached storage devices, and various other network-accessible services accessible on a secure network, access to the first application via which the identification information is received, or access to another application accessed on one or more network devices 104 (for example, different from the first network device 104 via which the identification information was obtained or the same first network device 104 via which the identification information was obtained)), or approve a user's initiated action (for example, initiated action to change contact data, pin or password, payment data, etc.).

In some embodiments, a single network device 104 may be utilized in a second use case. For example, a first application may be accessed on the network device 104 and identification information (for example, username, email address, numerical identification, etc.) may be input via a user interface of the first application. The network device 104 may be in direct communication with the server 102. The identification information may be communicated by the network device 104 to the server 102 via the network 150. In one scenario, in response to the received identification information, the server 102 may generate a message (possibly including a challenge code) and this message may be communicated directly to the first application on the network device 104. In such a scenario, a second application (which is used to confirm a user's identity) may receive the message from the first application via an interapp call. In response to receiving the message at the second application, a user (of the second network device 104) may be prompted to enter a pin or other credential data (for example, a password, a pattern lock, biometric data (for example, fingerprint data, facial data, iris data)) via the second application accessed on the network device 104 (controlling access to a digital authenticator previously registered with the server 102). In some embodiments, a predetermined number of attempts may be allowed for entering the pin (or other credential data) via the network device 104 before automatically locking the second application. In response to entering the correct pin (or other credential data), the second application may trigger direct communication of a confirmation message (indicating that the user has confirmed his/her identity) from the network device 104 to the server 102 via the network 150. Alternatively, the second application may communicate the confirmation message to the first application via an interapp call and in response to this, the first application may trigger direct communication of the confirmation message (indicating possibly via a response code that the user has confirmed his/her identity) from the network device 104 to the server 102 via the network 150.

In another scenario, in response to the received identification information, the server 102 may generate a message (possibly with a challenge code) and this message may be communicated directly to the second application (which is used to confirm a user's identity) accessed on the network device 104. For example, communicating the message to the network device 104 may trigger the second application to be accessed on the network device 104. In response to receiving the message at the second application, a user (of the second network device 104) may be prompted to enter a pin or other credential data (for example, a password, a pattern lock, biometric data (for example, fingerprint data, facial data, iris data)) via the second application accessed on the network device 104 (controlling access to a digital authenticator previously registered with the server 102). In some embodiments, a predetermined number of attempts may be allowed for entering the pin (or other credential data) via the network device 104 before automatically locking the second application. In response to entering the correct pin (or other credential data), the second application may trigger direct communication of a confirmation message (indicating possibly via a response code that the user has confirmed his/her identity) from the network device 104 to the server 102 via the network 150. Alternatively, the second application may communicate the confirmation message to the first application via an interapp call and in response to this, the first application may trigger direct communication of the confirmation message (indicating possibly via a response code that the user has confirmed his/her identity) from the network device 104 to the server 102 via the network 150.

In response to receiving the confirmation message from the network device 104 (either via the first application or the second application accessed on the network device 104), the server 102 may authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.). The communication between the server 102 and network devices 104 may be encrypted for added security.

It is important to securely process the confirmation of a user's identity in order to avoid hackers from being able to gain access to private and sensitive information. As discussed above, an application (for example, a second application accessed on a second network device 104 in the two-network device example discussed above or a second application accessed on a network device in a single network device example discussed above) accessed on a network device 104 may be utilized in order to confirm a user's identity. The processing of the data input via such an application and the processing of the application (including, for example, any display data associated with the application) needs to be secured. Several techniques may be used in order to securely process the application (including, for example, display data associated with the application) and the data obtained via the application and they are discussed below. The display data associated with the application may include confirmation data to confirm a user's initiated action to, for example, change contact data, pin or password, payment data, etc. The display data may include a portion via which input data (for example, user credential data) may be obtained in order to confirm the user's identity and to perform the user's initiated action in response to a confirmation of the user's identity. Display data may also include data received from the server 102 or another application (for example, as part of a challenge code, a QR code, or an interapp call). Display data may also be related to a user's initiated action to be approved, authenticating a user, or authorizing (or causing other services to authorize) access. Display data may include any data described herein that can be displayed via a user interface of, for example, a network device 104.

In some embodiments, sandboxing techniques may be utilized as a security mechanism for separately running programs. For example, a network device 104 (on which an application is accessed) may execute an application in a controlled environment. In some embodiments, as a security mechanism, an application (accessed on a network device 104) may be developed with special coding. In some embodiments software hardening tools may be employed to protect input/output to/from an application and keys hold by the application (e.g., root detection, whitebox crypto, code obfuscation, code integrity protection, own keyboards, etc.).

Additionally, or alternatively, in some embodiments, as a security mechanism, a network device 104 may securely store and process data in a hardware-separated environment of a network device 104. For example, data obtained via an application accessed on a network device 104 may be stored and processed in a hardware-separated environment of the network device 104 and the application (including, for example, display data associated with the application) may also be stored and processed in the hardware-separated environment. The data obtained may include a username and password combination, a pattern lock, a pin, biometric data (for example, fingerprint data, facial data, iris data), or other credential data suitable to authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.).

As discussed above, in a first use case, a first application may be accessed on a first network device 104 and a second application may be accessed on a second network device 104. In such a use case, as discussed above, a user may be prompted to enter a pin or other credential data (for example, a password, pattern lock, biometric data (for example, fingerprint data, facial data, iris data)) via the second application accessed on the second network device 104 (controlling access to a digital authenticator previously registered with the server 102). This obtained data (for example, entered pin or other credential data) and the second application (including, for example, display data associated with the second application) accessed, for example, on the second network device 104 may be stored and processed in a hardware-separated environment of the second network device 104. The processing of this obtained data may include a comparison of this data to other stored data (for example, stored credential data). In some embodiments, in response to determining a match between the obtained data and other stored data (for example, stored credential data), a confirmation message (indicating that the user has confirmed his/her identity) may be directly sent by the second network device 104 to the server 102 via the network 150. Alternatively, in response to determining a match between the obtained data and other stored data (for example, stored credential data), a second code (for example, a challenge response security code) may be generated by the second application accessed on the second network device 104, and this second code (a second factor authentication, which is recognized by the server 102, e.g. as a valid response generated with a previously registered digital authenticator) may be manually entered into the first application accessed on the first network device 104 and the second code may be communicated by the first network device 104 to the server 102. In response to receiving the recognized second code from the first network device 104 or the confirmation message from the second network device 104, the server 102 may authenticate a user, authorize (or causing other services to authorize) access (for example, access to the first network device 104, access to network resources on a secure network, including access to email accounts, bank accounts, document repositories, network attached storage devices, and various other network-accessible services accessible on a secure network, access to the first application via which the identification information is received, or access to another application accessed on one or more network devices 104 (for example, different from the first network device 104 via which the identification information was obtained or the same first network device 104 via which the identification information was obtained)), or approve a user's initiated action (for example, initiated action to change contact data, pin or password, payment data, etc.).

As discussed above, in a second use case, a first application and a second application may be accessed on a network device 104. In such a use case, as discussed above, a user may be prompted to enter a pin or other credential data (for example, a password, pattern lock, biometric data (for example, fingerprint data, facial data, iris data)) via the second application accessed on the network device 104 (controlling access to a digital authenticator previously registered with the server 102). This obtained data (for example, entered pin or other credential data) and the second application (accessed on the network device 104) may be stored and processed in a hardware-separated environment of the network device 104. The processing of this data may include a comparison of this data to other stored data (for example, stored credential data). In some embodiments, in response to determining a match between the obtained data and other stored data (for example, stored credential data), the second application may trigger direct communication of a confirmation message (indicating possibly via a response code that the user has confirmed his/her identity) from the network device 104 to the server 102 via the network 150. Alternatively, the second application may communicate the confirmation message to the first application via an interapp call and in response to this, the first application may trigger direct communication of the confirmation message (indicating that the user has confirmed his/her identity) from the network device 104 to the server 102 via the network 150. In response to receiving the confirmation message from the network device 104 (either via the first application or the second application accessed on the network device 104), the server 102 may authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.).

Figure 2:
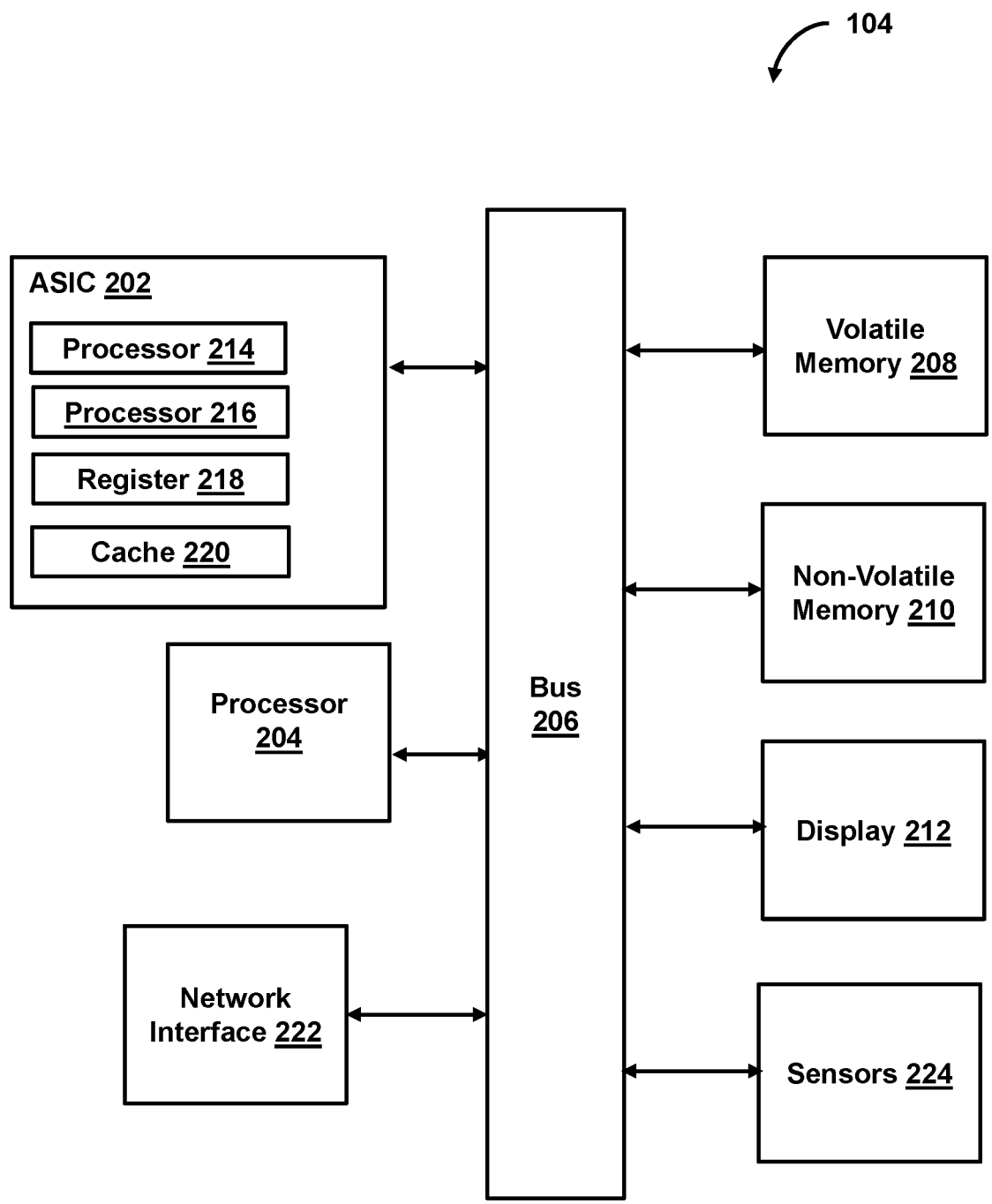
FIG. 2 illustrates a network device for securely storing or processing data in a hardware-separated environment of the network device, in accordance with one or more embodiments.

The codes described above and below may be randomly generated. As described in the above-noted use case examples, a network device 104 may securely store and process data (for example, credential data) and securely store and process an application (including, for example, securely store and process display data associated with the application), for example, via which the data is obtained in a hardware-separated environment of the network device 104. The description below will focus on the details with regard to securely storing and processing data and securely storing and processing an application (for example, via which the data is obtained) in a hardware-separated environment of the network device 104. FIG. 2 illustrates a network device 104 for securely storing and processing data in a hardware-separated environment of the network device 104. As illustrated in FIG. 2, the network device 104 may include an Application-Specific Integrated Circuit (ASIC)

202, processor 204, bus 206, volatile memory 208, non-volatile memory 210, display 212, network interface 222, sensors 224, or other components. ASIC 202 may include processor 214, processor 216, register 218, cache 220, or other components.

In some embodiments, the network device 104 may obtain input data via a user interface of an application accessed on the network device 104. This application (including, for example, display data associated with the application) accessed on the network device 104 may be stored and processed in a hardware-separated environment (for example, ASIC 202) of the network device 104. For example, a network device 104 may include a display 212 via which a user interface of an application may be displayed. A user may interact (for example, via a touchscreen) with the user interface of the application to enter the input data. The input data may include a username and password combination, a pattern lock, a pin, biometric data (for example, fingerprint data, facial data, iris data), or other credential data suitable to authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.). In some embodiments, a hardware-separated environment (for example, ASIC 202) of the network device 104 may visualize, obtain, and process the input data and may store and process the application (including, for example, display data associated with the application) via which the input data was obtained and visualized. For example, ASIC 202 may visualize and obtain the input data via a user interface of an application stored and processed by the hardware-separated environment (for example, ASIC 202) of the network device 104. In some embodiments, the application (including, for example, display data associated with the application) stored and processed by the hardware-separated environment (for example, ASIC 202) of the network device 104 may be an authentication application suitable to authenticate a user.

Figure 3:
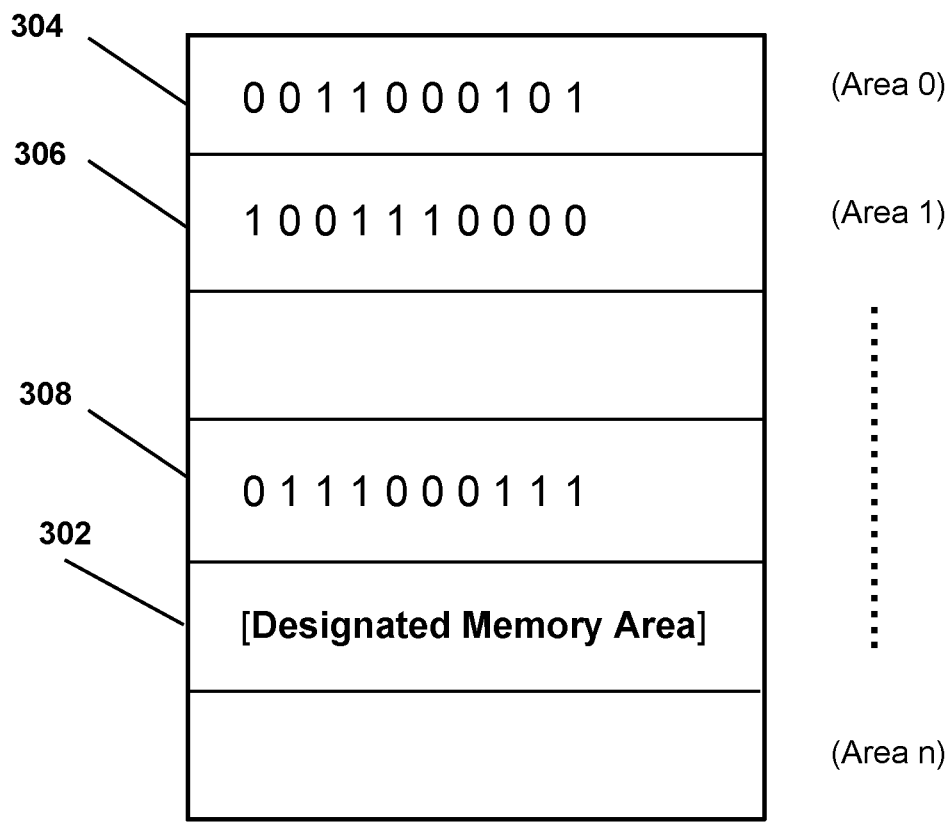
FIG. 3 illustrates different memory areas of volatile memory, cache, or register, in accordance with one or more embodiments.
Figure 4C:
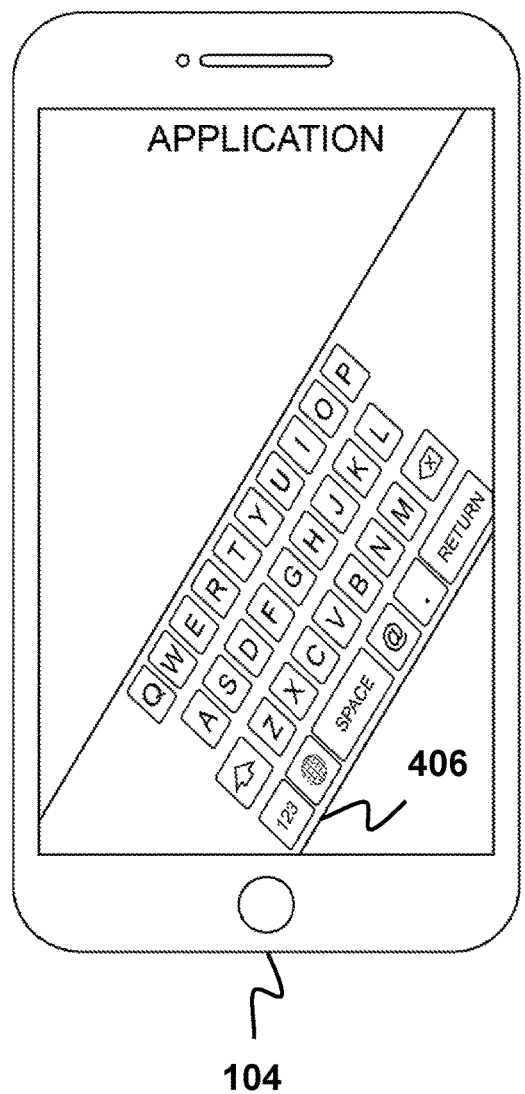
Figure 4D:
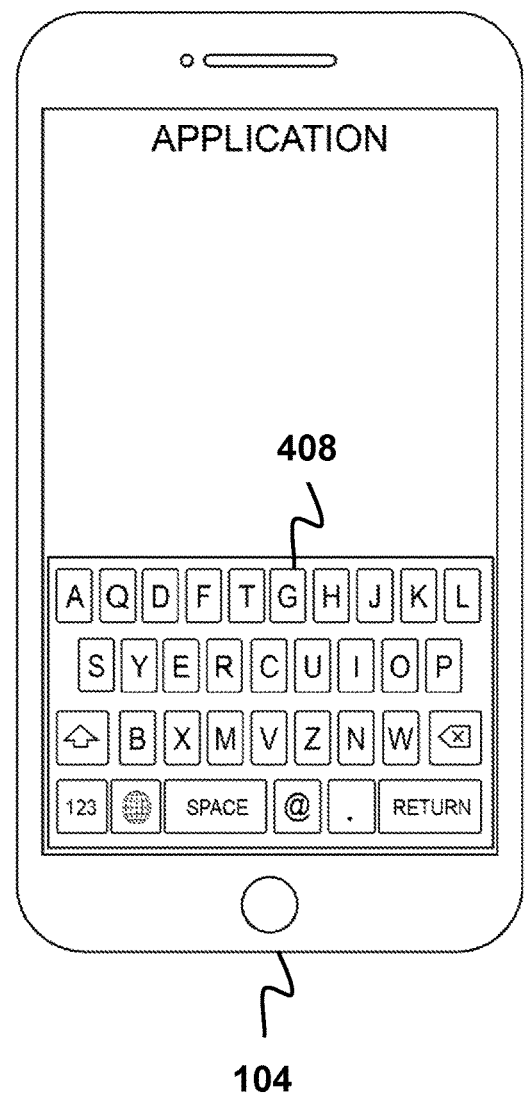

In some embodiments, an application may be retrieved from non-volatile memory 210 when such an application is triggered to be executed, may be stored in the register 218 or cache 220 (of ASIC 202) once retrieved, and may be processed and executed by processor 214 or processor 216 (of ASIC 202). The application may be designated to be stored in a specific memory area of the cache 220 or register 218. In some embodiments, the obtained input data (obtained via such an application stored and processed by the ASIC 202) may be temporarily stored in a hardware-separated environment of the network device 104. For example, the obtained input data may be stored in a physical memory area of a temporary storage of the network device 104. As illustrated in FIG. 2, the ASIC 202 may include a cache 220, which may store the obtained input data in a specific memory area of the cache 220. The cache 220 of the ASIC 202 may be divided into different memory areas, as illustrated in FIG. 3, and a specific physical memory area of the cache 220 may be designated to store the input data. As illustrated in FIG. 3, physical memory area 302 of cache 220 may be designated to store the input data obtained via a user interface of an application stored and processed by the ASIC 202. Other memory areas (i.e., 304, 306, and 308) illustrated in FIG. 3 may store other data. Alternatively, in some embodiments, the entire cache 220 may be designated to store input data obtained via a user interface of an application stored and processed by the ASIC 202. In some embodiments, different memory areas of the cache 220 may be designated to store input data obtained via user interfaces of different applications stored and processed by the ASIC 202. Alternatively, in some embodiments, the entire cache 220 may be designated to store input data obtained via user interfaces of a set of applications stored and processed by the ASIC 202. One or more applications (including, for example, display data associated with the one or more applications) stored and processed by the ASIC 202 may be associated with (or designated) one or more memory areas of the cache 220, and data obtained via the one or more applications may be stored in the designated (or associated) one or more memory areas of the cache 220.

In some embodiments, a physical memory area may be designated to store input data in response to a determination that the physical memory area has not be previously designated to store data associated with another application or is not currently storing data associated with another application. For instance, a first physical memory area of cache 220 or register 218 may be designated to store data obtained via a first application stored and processed by the ASIC 202 and a second physical memory area (for example, different from the first physical memory area) of cache 220 or register 218 may be designated to store data obtained via a second application stored and processed by the ASIC 202. In some embodiments, cache 220, register 218, or non-volatile memory 210 may store a table, which associates a physical memory area with a specific application. In other words, the table may indicate that a first physical memory area is associated with a first application (for example, to store data visualized and obtained via the first application, to store data processed by the first application, or to store the first application), may indicate that a second physical memory area is associated with a second application (for example, to store data visualized and obtained via the second application, to store data processed by the second application, or to store the second application), and so forth.

In some embodiments, the ASIC 202 may be inaccessible to other applications executing on the network device 104. In other words, in some embodiments, ASIC 202 may be designated to store data obtained via one or more applications stored and processed by the ASIC 202, to process the one or more applications (or data obtained via the one or more applications) stored and processed by the ASIC 202, and may be inaccessible to other applications accessed on the network device 104. These other applications which cannot access the ASIC 202 may access the processor 204 and may be processed by the processor 204. A list of these other applications that cannot access ASIC 202 may be stored in non-volatile memory 210. Another processor (for example, processor 204) illustrated in FIG. 2 may process these other applications accessed on the network device 104.

In some embodiments, the ASIC 202 (for example, processor 214 or processor 216) may be designated to process a set of applications, where the set of applications may include one or more applications. The set of applications may be stored in a non-volatile memory 210 and the address of the instructions corresponding to the set of applications stored in a non-volatile memory 210 may be stored in cache 220 or register 218. Alternatively, in some embodiments, the set of applications may be retrieved from the non-volatile memory 210 and stored in cache 220 or register 218. In some embodiments, a specific physical memory area of the cache 220 or register 218 may be designated for storing the one or more applications and the data processed by one or more applications. Alternatively, in some embodiments, the entire cache 220 or register 218 may be designated to store data processed by one or more applications.

In some embodiments, a physical memory area (for example, memory area 302 in FIG. 3) of the cache 220 or register 218 (see FIG. 3) may be designated for securely storing data processed by an application (for example, an application designated to be stored and processed by ASIC 202) via processor 214 or 216. The data processed by an application may include input data obtained via a user interface of an application stored and processed by the ASIC 202. The data processed by an application may also include data resulting from the processing of the input data. For example, data processed by an application may include data indicating whether or not the input data (for example, credential data) matches stored credential data (for example, stored in register 218, cache 220, or non-volatile memory 210) in order to determine whether to authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.).

In some embodiments, the physical memory area (for example, memory area 302 in FIG. 3) of the cache 220 or register 218 may remain designated for securely storing the data processed by an application, storing the input data obtained via a user interface of the application, or storing an application (including, for example, display data associated with the application) when the network device 104 is rebooted. Further, some embodiments, in response to a reboot of the network device 104, may reapply the designation of the physical memory area (for example, memory area 302 in FIG. 3) of the temporary storage (for example, cache 220 or register 218) to securely store data processed by the application, store the input data obtained via a user interface of the application, or store the application (including, for example, display data associated with the application). In other words, while a reboot of the network device 104 may result in data being deleted from temporary storages (for example, cache 220 and register 218), some embodiments may reapply the designation of a physical memory area of the cache 220 or register 218 to store data processed by the application, store the input data obtained via the application, or store the application (including, for example, display data associated with the application) in response to a reboot of the network device 104.

In some embodiments, in addition to being designated to store data associated with a set of applications, the ASIC 202 may be designated to process the data associated with the set of applications, where the set of applications may be one or more applications. The ASIC 202 may be designated to process input data via the physical memory area (for example, memory area 302 designated to store the input data obtained via a user interface of an application stored and processed by the ASIC 202) of a temporary storage (for example, cache 220 or register 218 in FIGS. 2 and 3) in accordance with instructions of an application via which the input data was obtained. In other words, some embodiments may designate ASIC 202 (for example, processor 214 or 216 in FIG. 2) to process the input data via a physical memory area of cache 220 or register 218 in accordance with instructions of an application. Specifically, the processor 214 or 216 may retrieve the input data obtained via a user interface of an application from cache 220 or register 218 and may process the input data via the cache 220 or register 218 in accordance with instructions of the application stored and processed by the ASIC 202. The processed data may then be stored in a physical memory area (for example, memory area 302 designated to store data processed by ASIC 202) of the cache 220 or register 218.

In some embodiments, the processing of the input data via the cache 220 or register 218 may include several steps. For instance, the processor 214 or 216 may retrieve the input data from the cache 220 or register 218 and compare the input data to other data stored in the cache 220, register 218, or non-volatile memory 210. The other data may also include a username and password combination, a pattern lock, a pin, biometric data (for example, fingerprint data, facial data, iris data), or other credential data suitable to authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.). In some embodiments, the comparison may be performed within the ASIC 202 (for example, by processor 214 or 216) to avoid transmitting the input data outside of the hardware-separated environment (for example, ASIC 202).

In some embodiments, the processor 214 or 216 may determine whether the input data matches the other data and in response to the determination that the input data matches the other data, the processor 214 or 216 may generate a confirmation message (confirming the identity of the user) and such a confirmation message may be transmitted to the server 102 so to authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.). In some embodiments, once the comparison is performed within the ASIC 202, the results of the comparison may be transmitted to the server 102 (for example, as a confirmation message) and the server 102 may authenticate a user, authorize access, or approve a user's initiated action (as noted above). Alternatively, the processor 214 or 216 may generate a code, as discussed above in the two use cases, in response to the determination that the input data matches the other data, and such a code may be transmitted to the server 102 in order for the server 102 to authenticate a user, authorize access, or approve a user's initiated action (as noted above).

In some embodiments, multiple factor authentication may be required to authenticate a user, authorize access, or approve a user's initiated action (as noted above). In some embodiments, in response to the determination that the input data matches the other stored data, the processor 214 or 216 may generate a confirmation message or a code that may be sent to the server 102. In response to receiving such a confirmation message or code, the server 102 may generate an authentication code and send this authentication code, via, for example, email or text or any other channel of communication (for example, via a channel of communication different from the user interface of the application accessed on the network device 104 or via an application different from the application accessed on the network device 104) to a user. In some embodiments, when the authentication code is entered via the application stored and processed by the ASIC 202, another message (including the entered authentication code) may be sent to the server 102 so as to authenticate a user, authorize access, or approve a user's initiated action (as noted above). In response to authenticating the user, authorizing access, or approving a user's initiated action, a confirmation (for example, indicating that the user has been authenticated, authorized access, or approved) may be displayed via the user interface of the application accessed via the network device 104 or another user interface of another application accessed via another network device 104.

In some embodiments, the input data may be stored in the form of a cryptographic hash in the physical memory area (for example, memory area 302 in FIG. 3) of temporary storage (for example, cache 220 or register 218 in FIGS. 2 and 3) of the network device 104. In other words, the storing of the input data, as described above, may include storing a cryptographic hash of the input data in the physical memory area (for example, memory area 302 in FIG. 3) of temporary storage (for example, cache 220 or register 218 in FIGS. 2 and 3) of the network device 104.

Further, in some embodiments, the processing of the input data via the physical memory area of temporary storage may include retrieving the cryptographic hash of the input data from the physical memory area (for example, memory area 302) and comparing the cryptographic hash of the input data to cryptographic hashes of other data (for example, credential data) stored in, for example, non-volatile memory 210, register 218, or cache 220. In some embodiments, the processing of the input data via the physical memory area of temporary storage may further include determining whether the cryptographic hash of the input data matches a cryptographic hash of the credential data and in response to the determination that the cryptographic hash of the input data matches the cryptographic hash of the credential data, authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.). The cryptographic hashes of the input data and the cryptographic hashes of the other data (for example, credential data) may use the same cryptographic hash function and salt, like SHA 256 or MD5 hashes, so that comparisons may be performed without having access to the input data and the other data.

It may be advantageous to store and process data and store and process an application (including, for example, display data associated with the application) via which the data is obtained in a hardware-separated environment (for example, ASIC 202). Designating a particular memory area to store input data obtained via a user interface of an application stored and processed by ASIC 202 and making the particular memory area (and the ASIC 202 in general) inaccessible to other applications accessed on a network device 104 allows the network device 104 to protect the input data (for example, credential data) from being hacked by unauthorized actors. Specifically, even if unauthorized actors get access to the network device 104, they may not be able to get access to the ASIC 202 (i.e., the hardware-separated environment that stores the input data) because the ASIC 202 is inaccessible to any application that has not been previously authorized. In other words, since a specific application is designated to access the ASIC 202 and be stored in the ASIC 202, since a particular memory area is designated to store data associated with the specific application, and since other applications are prevented from accessing the particular memory area, hacking of credential data may be prevented. The use of cryptographic hashes provides additional security advantages. The storing of data as cryptographic hashes adds another layer of security and prevents utilization of credential data by unauthorized actors.

In some embodiments, the details described above and below with regard to processor 214 (or processor 216) also apply to processor 204 and the details described above and below with regard to register 218 and cache 220 also apply to volatile memory 208. Accordingly, for the sake of brevity, the details are not repeated.

In some embodiments, the processors (for example, processors 214 and 216) of the ASIC 202 and processor 204 may be associated with separate secure operating systems. When an application (for example, an application discussed above that is stored and processed by ASIC 202) is triggered, execution of a separate secure OS associated with the ASIC 202 may be executed. In some embodiments, when the application is no longer triggered, a separate secure OS associated with the processor 204 may be executed. GlobalPlatform.org TEE standards or Arm Trustzone Technology may be implemented in the network devices 104 for secure processing of data.

Further in some embodiments, the network device 104 may only include the ASIC 202. In such a case, the ASIC 202 may include multi-mode processors 214 and 216 that operate in different modes. For instance, when an application (to authenticate a user, authorize a user, or approve a user's initiated action) is triggered, the ASIC 202 may operate in a first mode such that the application is stored and processed by the ASIC 202 and the data obtained via such an application is also visualized, obtained, and stored by the ASIC 202. Further, in this first mode, ASIC 202 may be inaccessible to other applications. In a different mode (for example, a second mode), the ASIC 202 may operate such that the ASIC 202 is accessible by all applications and data obtained via all applications may be stored and processed by ASIC 202 in the second mode. Similarly, in some embodiments, the network device 104 may only include processor 204 and processor 204 may be configured to be operable in similar a multi-mode manner described above with regard to ASIC 202.

FIG. 3 illustrates different memory areas of volatile memory 208, cache 220, or register 218. As discussed above, a memory may be divided in a plurality of memory areas (for example, memory areas 302, 304, 306, and 308) and a specific memory area (for example, memory area 302) may be designated to store data (and store the application processed by the ASIC 202) associated with an application stored and processed by ASIC 202. Although memory area 302 is illustrated as being designated as a designated memory area, it should be understood that any memory area of volatile memory 208, cache 220, or register 218 may be designated to store data (and store the application processed by the ASIC 202) associated with an application stored and processed by ASIC 202. For example, a particular memory area 302 may be designated to store data associated with a specific application and a specific processor (for example, processor 214/216 of ASIC 202), if, for example, the specific application is accessed by the specific processor. As also discussed above, the designated memory area may be inaccessible to other applications accessed on the network device 104.

FIGS. 4A-4D illustrate a plurality of keyboard layouts. The keyboard layouts may be accessed via an application in any of the examples discussed in this disclosure. Displaying custom keyboard layouts may be advantageous to prevent an unauthorized actor from gaining access to data input via a keyboard. By displaying a custom keyboard layout, an unauthorized actor may not be able to discern input data entered via a user interface of an application and therefore may not be able to gain access to such input data. In some embodiments, a custom keyboard layout may be generated and may be displayed via a user interface of an application stored and processed by ASIC 202. The custom keyboard layout may be randomly generated. In some embodiments, the custom keyboard layout may differ in size (FIG. 4A), shape (FIG. 4B), orientation (FIG. 4C), or layout of characters (FIG. 4D) from a regular keyboard layout. For example, a custom keyboard layout 402 may be generated to be smaller than a regular keyboard layout (FIG. 4A), a custom keyboard layout 404 may be generated to be a different shape (FIG. 4B) from a regular keyboard layout, a custom keyboard layout 406 may be generated to have a different orientation (FIG. 4C) than a regular keyboard, or a custom keyboard layout 408 may be generated to display characters in a different order (FIG. 4D) than a regular keyboard layout. The custom keyboard layout may be displayed (for example, via display 212 of the network device 104) via a user interface of an application stored and processed by ASIC 202, and input data may be obtained via the custom keyboard layout. In some embodiments, in response to executing an application, a custom keyboard layout may be generated and displayed so as to receive input data.

In some embodiments, the network device 104 may store a plurality of keyboard layouts that have been previously generated. The plurality of keyboard layouts may be stored in a particular physical memory area (for example, memory area 302 in FIG. 3) of the temporary storage (for example, cache 220, register 218, or volatile memory 208) or may be stored in non-volatile memory 210. The plurality of keyboard layouts may differ in size (FIG. 4A), shape (FIG. 4B), orientation (FIG. 4C), or layout of characters (FIG. 4D) from a regular keyboard layout. As noted above, a keyboard layout 402 may be generated to be smaller than a regular keyboard layout (FIG. 4A), a keyboard layout 404 may be generated to be a different shape (FIG. 4B) from a regular keyboard layout, a keyboard layout 406 may be generated to have a different orientation (FIG. 4C) than a regular keyboard, or a keyboard layout 408 may be generated to display characters in a different order (FIG. 4D) than a regular keyboard layout.

In some embodiments, one keyboard layout may be selected from the plurality of keyboard layouts and this keyboard layout may be displayed (for example, via display 212 of the network device 104) via a user interface of an application stored and processed by ASIC 202. The selection of the keyboard layout may be random or may depend on previous selections. For example, if the keyboard layout illustrated in FIG. 4A was previously selected, then some embodiments may select another keyboard layout (for example, keyboard layouts illustrated in FIGS. 4B-4D). Input data may be obtained via the keyboard layout. In some embodiments, in response to executing an application, a keyboard layout may be selected and displayed so as to receive input data.

As noted above, displaying custom keyboard layouts may be advantageous to prevent an unauthorized actor from gaining access to data input via a keyboard. By displaying a custom keyboard layout, an unauthorized actor may not be able to discern input data (e.g., the locations on a touch screen that a user taps) entered via a user interface of an application and therefore may not be able to gain access to such input data.

Example Flowcharts

The processing operations of the methods presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 5:
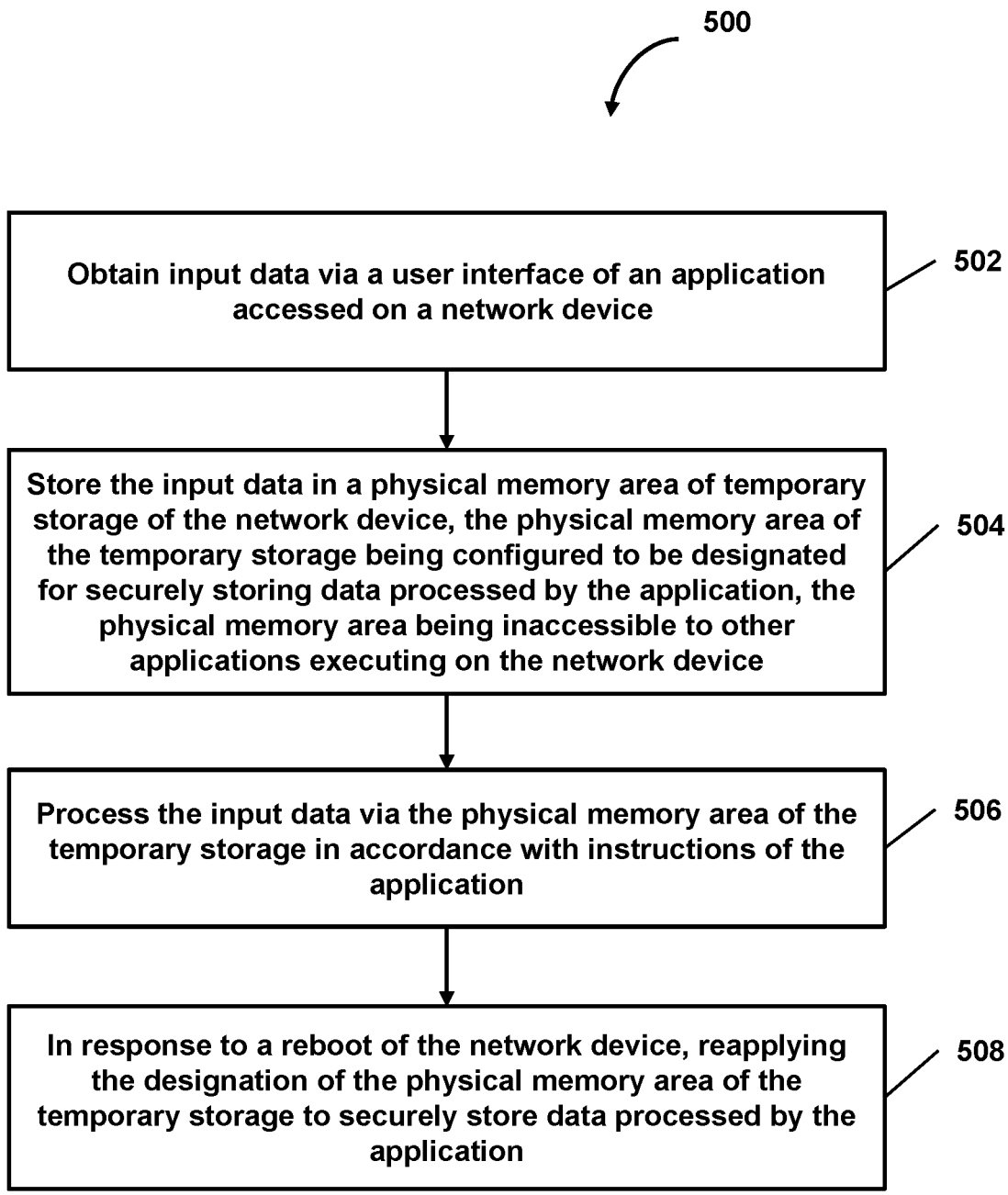
FIG. 5 illustrates an example flowchart describing a method for securely storing or processing input data obtained by an application, in accordance with one or more embodiments.

FIG. 5 illustrates an example flowchart 500 describing a method for securely storing or processing input data obtained by an application. In step 502, input data may be obtained via a user interface of an application accessed on a network device (for example, an application stored and processed by ASIC 202). In step 504, the input data may be stored in a physical memory area of temporary storage of the network device. The application may also be stored in the temporary storage. The physical memory area of the temporary storage may be configured to be designated for securely storing data processed by the application and to remain designated for securely storing data processed by the application when the network device is rebooted. The physical memory area may be inaccessible to other applications executing on the network device. In other words, a physical memory area may be designated to store data associated with an application and this physical memory area may be inaccessible to other applications executed on the network device and to data associated with the other applications executed on the network device.

In step 506, the input data may be processed via the physical memory area of the temporary storage in accordance with instructions of the application. Details with regard to processing of the input data are described above with regard to FIGS. 1-4 and below with regard to FIG. 6. In step 508, the designation of the physical memory area of the temporary storage to securely store data processed by the application may be reapplied in response to a reboot of the network device.

Figure 6:
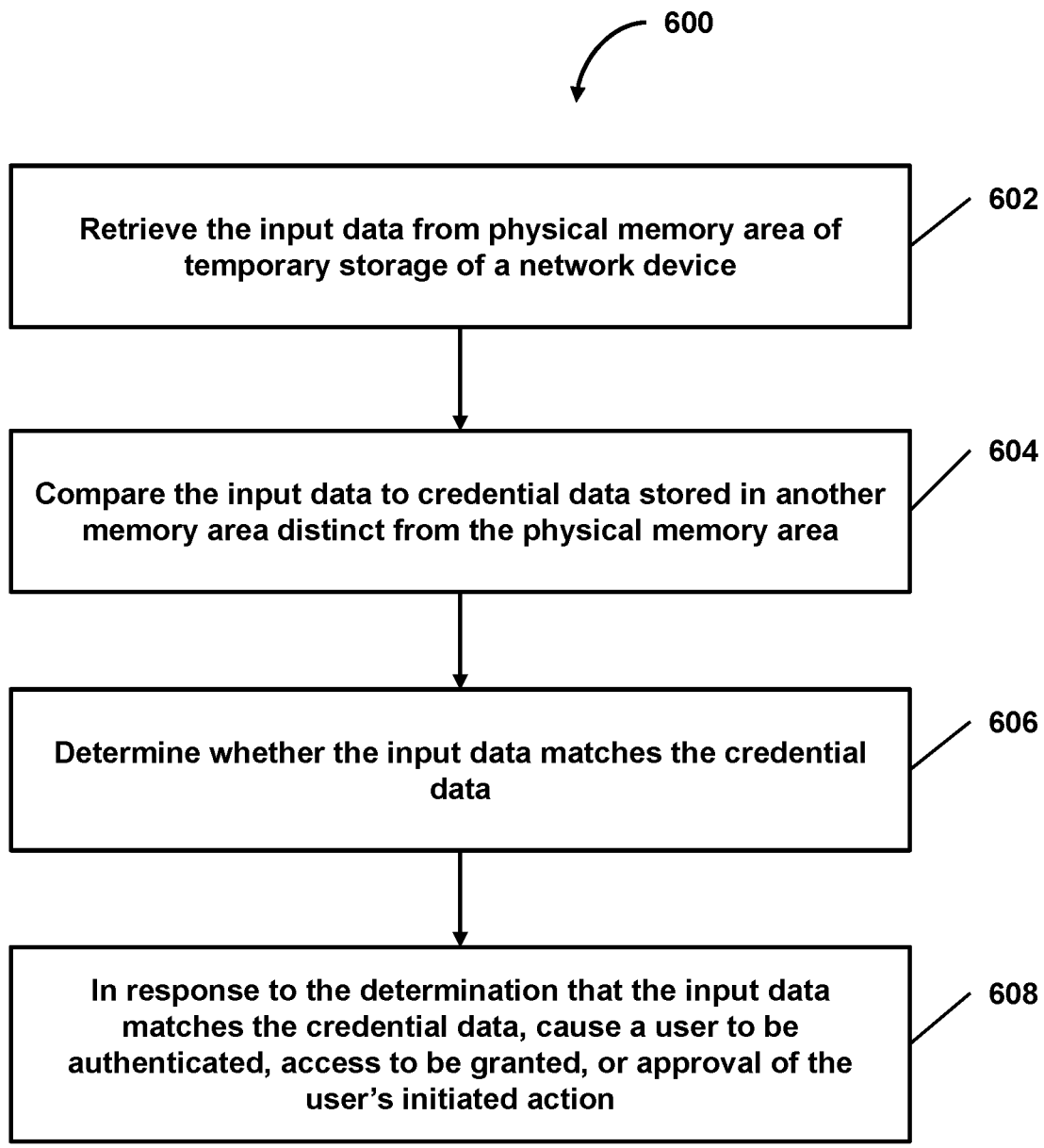
FIG. 6 illustrates an example flowchart describing a method for securely processing input data obtained by an application, in accordance with one or more embodiments.

FIG. 6 illustrates an example flowchart 600 describing a method for securely processing input data obtained by an application. In step 602, input data may be retrieved from a physical memory area of temporary storage of a network device. In some embodiments, the cryptographic hash of the input data may be retrieved from the physical memory area of temporary storage of a network device. In step 604, the input data may be compared to credential data stored in another memory area different from the physical memory area. In some embodiments, the cryptograph hash of the input data may be compared to cryptographic hashes of credential data stored in another memory area different from the physical memory area.

In step 606, a determination may be made as to whether the input data matches the credential data. In some embodiments, a determination may be made as to whether the cryptographic hash of the input data matches a cryptographic hash of the credential data. In step 608, in response to the determination that the input data matches the credential data, a user may be authenticated, access may be authorized to additional data, or a user's initiated actions may be approved. In some embodiments, in response to the determination that the cryptographic hash of the input data matches the cryptographic hash of the credential data, a user may be authenticated, access may be authorized to additional data, or a user's initiated actions may be approved. Some embodiments, in response to the determination that the input data (or cryptographic hash of the input data) matches the credential data (or cryptographic hash of the credential data), may authenticate a user, authorize (or causing other services to authorize) access (for example, access to the network device 104, access to network resources on a secure network, including access to email accounts, bank accounts, document repositories, network attached storage devices, and various other network-accessible services accessible on a secure network, access to the application via which the identification information is received, or access to another application accessed on one or more network devices 104 (for example, different from the network device 104 via which the identification information was obtained or the same network device 104 via which the identification information was obtained)), or approve a user's initiated action (for example, initiated action to change contact data, pin or password, payment data, etc.). In some embodiments, data may be displayed prior to verifying whether the input data matches the stored credential data. Further, in some embodiments, data (which includes an indication that the user is authenticated, the access is granted, or the user's initiated action is approved) may be displayed in response to the determination that the input data matches stored credential data.

Figure 7:
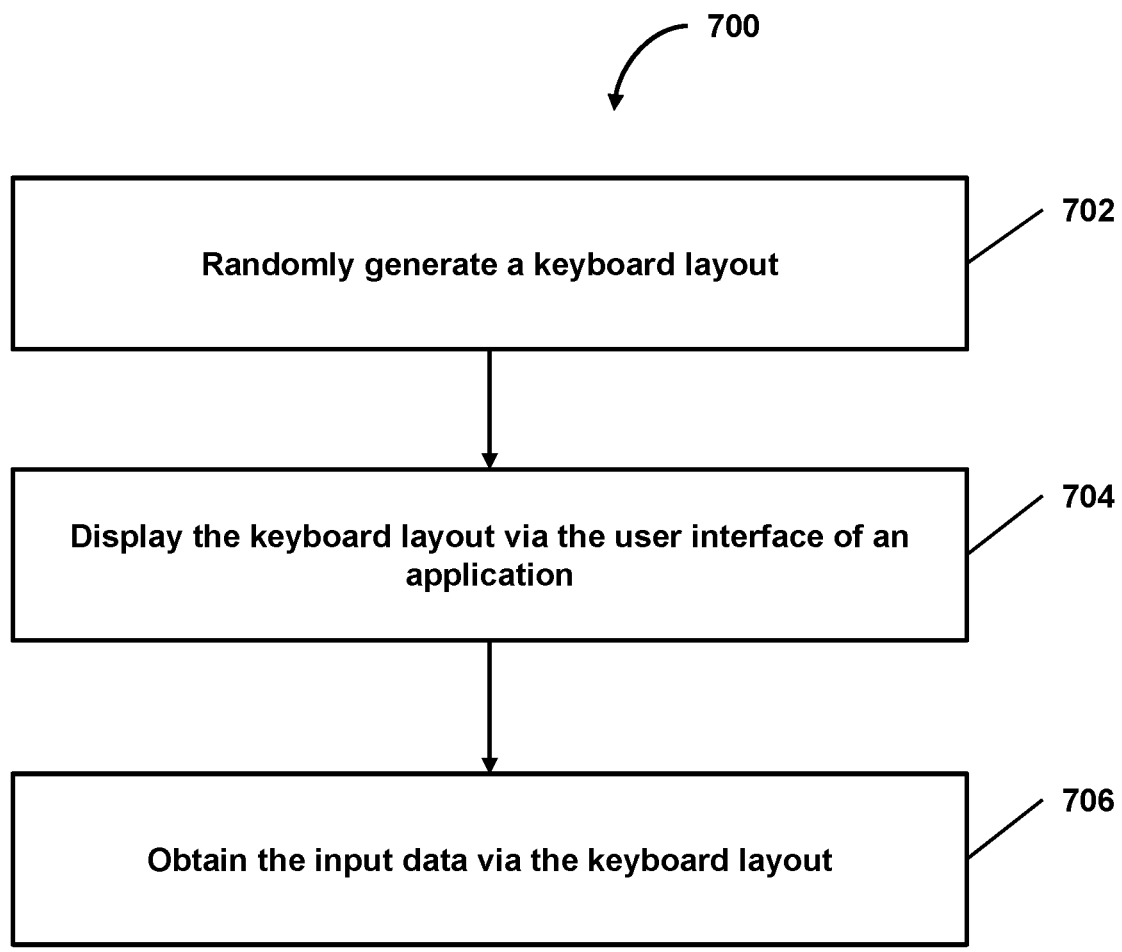
FIG. 7 illustrates an example flowchart describing a method for obtaining input data from a keyboard layout, in accordance with one or more embodiments.

FIG. 7 illustrates an example flowchart 700 describing a method for obtaining input data from a keyboard layout. In step 702, a keyboard layout may be randomly generated. In some embodiments, the keyboard layout may differ in size, shape, orientation, or layout of characters from a regular keyboard layout. For example, a custom keyboard layout may be randomly generated to be smaller than a regular keyboard layout, a custom keyboard layout may be randomly generated to be a different shape from a regular keyboard layout, a custom keyboard layout may be randomly generated to have a different orientation than a regular keyboard, or a custom keyboard layout may be randomly generated to display characters in a different order than a regular keyboard layout. In step 704, the custom keyboard layout (which was randomly generated) may be displayed via a user interface of an application. In step 706, input data may be obtained via the custom keyboard layout.

Figure 8:
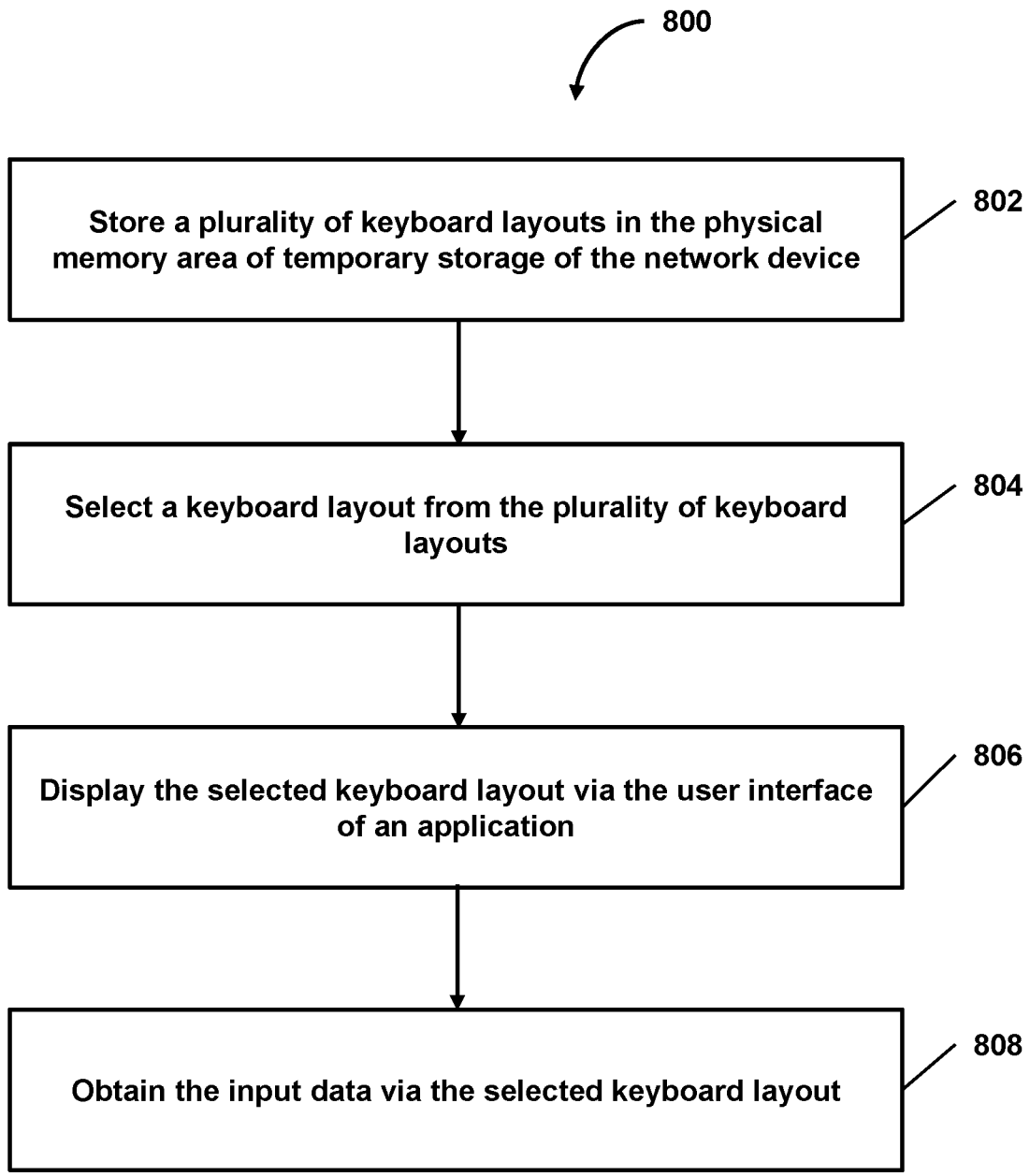
FIG. 8 illustrates another example flowchart describing a method for obtaining input data from a keyboard layout, in accordance with one or more embodiments.

FIG. 8 illustrates another example flowchart 800 describing a method for obtaining input data from a custom keyboard layout. In step 802, a plurality of custom keyboard layouts may be stored in a physical memory area of temporary storage of a network device. The plurality of custom keyboard layouts may differ in size, shape, orientation, or layout of characters from a regular keyboard layout. For example, a custom keyboard layout may be smaller than a regular keyboard layout, a custom keyboard layout may be a different shape from a regular keyboard layout, a custom keyboard layout may have a different orientation than a regular keyboard, or a custom keyboard layout may display characters in a different order than a regular keyboard layout. In step 804, a custom keyboard layout may be selected from the plurality of custom keyboard layouts. The selection of the custom keyboard layout may be random or may depend on previous selections. For example, if the custom keyboard layout illustrated in FIG. 4A was previously selected, then some embodiments may select another custom keyboard layout (for example, custom keyboard layouts illustrated in FIGS. 4B-4D). Further, in step 806, the selected custom keyboard layout may be displayed via the user interface of an application. In step 808, input data may be obtained via the selected custom keyboard layout.

In some embodiments, the various computers and subsystems illustrated in FIG. 1 may include one or more computing devices that are programmed to perform the functions described herein. The computing devices may include one or more electronic storages (e.g., database(s) 132, or other electronic storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-114 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-114 described herein is for illustrative purposes, and is not intended to be limiting, as any of subsystems 112-114 may provide more or less functionality than is described. For example, one or more of subsystems 112-114 may be eliminated, and some or all of its functionality may be provided by other ones of subsystems 112-114. As another example, additional subsystems may be programmed to perform some or all of the functionality attributed herein to one of subsystems 112-114.

In some embodiments, processors 204, 214, and 216 may include a single processor or a plurality of processors (e.g., distributed processors). Processors 204, 214, and 216 may include a central processing unit (CPU) that carries out program instructions to perform the arithmetical, logical, and input/output operations of network device 104. Processors 204, 214, and 216 may execute code (e.g., processor firmware, a protocol stack, a database management system, an operating system, or a combination thereof) that creates an execution environment for program instructions. Processors 204, 214, and 216 may include a programmable processor. Processors 204, 214, and 216 may include general or special purpose microprocessors. Processors 204, 214, and 216 may receive instructions and data from a memory (e.g., register 218, cache 220, volatile memory 208, or non-volatile memory 210). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Network device 104 may include a plurality of computing devices (e.g., distributed computer systems) to implement various processing functions.

Register 218, cache 220, volatile memory 208, and non-volatile memory 210 may be configured to store program instructions or data. Program instructions may be executable by a processor (e.g., one or more of processors 214, 216, or 204) to implement one or more embodiments of the present techniques. Instructions may include modules of computer program instructions for implementing one or more techniques described herein with regard to various processing modules. Program instructions may include a computer program (which in certain forms is known as a program, software, software application, application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

Register 218, cache 220, volatile memory 208, and non-volatile memory 210 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. Register 218, cache 220, volatile memory 208, and non-volatile memory 210 may include a non-transitory computer readable storage medium that may have program instructions stored thereon that are executable by a computer processor (e.g., one or more of processors 214, 216, or 204) to cause the subject matter and the functional operations described herein. A memory (e.g., register 218, cache 220, volatile memory 208, and non-volatile memory 210) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

Display 212 of the network device 104 may be a liquid crystal display (LCD), an Organic light-emitting diode (OLED) display, or a Retina Display. The display 212 may be a touchscreen display that acts as an input device by responding to touch of a user's touch. The display 212 may display a plurality of user interfaces of a plurality of applications executed on the network device 104.

Network interface 222 may include a network adapter that provides for connection of the network device 104 to a network (for example, network 150). Network interface 222 may facilitate data exchange between mobile device 104 and other devices connected to the network. Network interface 222 may support wireless communication. The network 150 may include an electronic communication network, such as the Internet, a local area network (LAN), a wide area network (WAN), a cellular communications network, or the like. The various devices may be attached through various types of buses (for example, bus 206), such as a variant of the Peripheral Component Interconnect (PCI) bus standard or the Universal Serial Bus (USB) standard. Sensors 224 may include proximality sensors, accelerometer, gyroscope, digital compass, magnetometer, gps, barometer, biometric sensors (for example, finger print recognition, IRIS (eye) scanning, full facial recognition, voice recognition, signature recognition, etc.), touchscreen sensors, ambient light sensors, pedometer, barcode/QR code sensors, heart rate sensors, thermometer, air humidity sensors, and geiger counter.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment. Further, although the above operations have been described as being performed in a centralized manner, it should be understood that the above operations may be performed in a de-centralized manner, using blockchain technology for example.

The present techniques will be better understood with reference to the following enumerated embodiments:

1. A method for securely storing and processing inputs provided to an application, the the method implemented by one or more processors executing computer program instructions that, when executed, perform the method, the method comprising: obtaining input data via a user interface of an authentication application accessed on a mobile device; storing the input data in a physical memory area of temporary storage of the mobile device, the physical memory area of the temporary storage being configured to be designated for securely storing data processed by the authentication application and to remain designated for securely storing data processed by the authentication application when the mobile device is rebooted, the physical memory area being inaccessible to other applications executing on the mobile device; processing the input data via the physical memory area of the temporary storage in accordance with instructions of the authentication application; and in response to a reboot of the mobile device, reapplying the designation of the physical memory area of the temporary storage to securely store data processed by the authentication application.

2. The method of embodiment 1, wherein the input data is processed by at least one processor designated to execute the authentication application, the at least one processor being inaccessible to the other applications executing on the mobile device.

3. The method of any of embodiments 1 or 2, further comprising: comparing the input data to credential data stored in another memory area different from the physical memory area; generating, by the authentication application, a code in response to a determination that the input data matches the credential data; and sending the code to a server.

4. The method of any of embodiments 1-3, further comprising: displaying data via the user interface of the authentication application, wherein a user is authenticated, access is granted, or the user's initiated action is approved in response to a determination that the input data matches stored credential data, and wherein the data displayed includes an indication that the user is authenticated, the access is granted, or the user's initiated action is approved in response to the determination that the input data matches stored credential data.

5. The method of any of embodiments 1-4, further comprising: displaying data via the user interface of the authentication application, wherein a user is authenticated, access is granted, or the user's initiated action is approved in response to a proper validation of the code sent to the server, and wherein the data displayed includes an indication that the user is authenticated, the access is granted, or the user's initiated action is approved in response to the proper validation of the code sent to the server.

6. The method of any of embodiments 1-5, further comprising: randomly generating a keyboard layout; displaying the keyboard layout via the user interface of the authentication application; and obtaining the input data via the keyboard layout.

7. The method of any of embodiments 1-6, further comprising: storing a plurality of keyboard layouts in the physical memory area of temporary storage of the mobile device; selecting a keyboard layout from the plurality of keyboard layouts; displaying the selected keyboard layout via the user interface of the authentication application; and obtaining the input data via the selected keyboard layout.

8. The method of any of embodiments 1-7, wherein storing the input data in the physical memory area of temporary storage of the mobile device includes storing a cryptographic hash of the input data in the physical memory area of temporary storage of the mobile device, the method further comprising: retrieving the cryptographic hash of the input data from the physical memory area; and comparing the cryptograph hash of the input data to cryptographic hashes of credential data stored in another memory area different from the physical memory area.

9. The method of any of embodiments 1-8, further comprising: determining whether the cryptographic hash of the input data matches a cryptographic hash of the credential data, wherein a user is authenticated, access is granted, or the user's initiated action is approved in response to the determination that the cryptographic hash of the input data matches the cryptographic hash of the credential data.

10. The method of any of embodiments 1-9, further comprising: comparing the input data to credential data stored in another memory area different from the physical memory area; generating, by the authentication application, a code in response to a determination that the input data matches the credential data; and sending the code to a server.

11. The method of any of embodiments 1-10, further comprising: displaying data via the user interface of the authentication application, wherein a user is authenticated, access is granted, or the user's initiated action is approved in response to inputting the code via another application accessed on another device and validating the code sent to the server, and wherein the data displayed includes an indication that the user is authenticated, the access is granted, or the user's initiated action is approved in response to inputting the code via the other application accessed on the other device and validating the code sent to the server.

12. A system, comprising: one or more processors; and memory storing instructions that when executed by the processors cause the processors to effectuate operations comprising those of any of embodiments 1-11.

13. A tangible, non-transitory, machine-readable medium storing instructions that when executed by a data processing apparatus cause the data processing apparatus to perform operations comprising those of any of embodiments 1-11.

What is claimed is:

1. A method for securely storing and processing inputs provided to an application, the method implemented by one or more processors executing computer program instructions that, when executed, perform the method, the method comprising:
    obtaining input data via a user interface of an authentication application accessed on a mobile device;
    storing the input data in a physical memory area of temporary storage of the mobile device, the physical memory area of the temporary storage being configured to be designated for securely storing only data processed by the authentication application and to remain designated for securely storing only data processed by the authentication application when the mobile device is rebooted, the physical memory area being inaccessible to other applications executing on the mobile device;
    processing the input data via the physical memory area of the temporary storage in accordance with instructions of the authentication application; and
    in response to a reboot of the mobile device, reapplying the designation of the physical memory area of the temporary storage to securely store data processed by the authentication application.

2. The method of claim 1, wherein the input data is processed by at least one processor designated to execute the authentication application, the at least one processor being inaccessible to the other applications executing on the mobile device.

3. The method of claim 1, further comprising:
    comparing the input data to credential data stored in another memory area different from the physical memory area;
    generating, by the authentication application, a code in response to a determination that the input data matches the credential data; and
    sending the code to a server.

4. The method of claim 1, further comprising:
    displaying data via the user interface of the authentication application, wherein a user is authenticated, access is granted, or the user's initiated action is approved in response to a determination that the input data matches stored credential data, and wherein the data displayed includes an indication that the user is authenticated, the access is granted, or the user's initiated action is approved in response to the determination that the input data matches stored credential data.

5. The method of claim 3, further comprising:
    displaying data via the user interface of the authentication application, wherein a user is authenticated, access is granted, or the user's initiated action is approved in response to a proper validation of the code sent to the server, and wherein the data displayed includes an indication that the user is authenticated, the access is granted, or the user's initiated action is approved in response to the proper validation of the code sent to the server.

6. The method of claim 1, further comprising:
    randomly generating a keyboard layout;
    displaying the keyboard layout via the user interface of the authentication application; and
    obtaining the input data via the keyboard layout.

7. The method of claim 1, further comprising:
    storing a plurality of keyboard layouts in the physical memory area of temporary storage of the mobile device;
    selecting a keyboard layout from the plurality of keyboard layouts;
    displaying the selected keyboard layout via the user interface of the authentication application; and
    obtaining the input data via the selected keyboard layout.

8. The method of claim 1, wherein storing the input data in the physical memory area of temporary storage of the mobile device includes storing a cryptographic hash of the input data in the physical memory area of temporary storage of the mobile device, the method further comprising:
    retrieving the cryptographic hash of the input data from the physical memory area; and
    comparing the cryptograph hash of the input data to cryptographic hashes of credential data stored in another memory area different from the physical memory area.

9. The method of claim 8, further comprising:
    determining whether the cryptographic hash of the input data matches a cryptographic hash of the credential data, wherein a user is authenticated, access is granted, or the user's initiated action is approved in response to the determination that the cryptographic hash of the input data matches the cryptographic hash of the credential data.

10. The method of claim 1, further comprising:
    comparing the input data to credential data stored in another memory area different from the physical memory area;
    generating, by the authentication application, a code in response to a determination that the input data matches the credential data; and
    sending the code to a server.

11. The method of claim 10, further comprising:
    displaying data via the user interface of the authentication application, wherein a user is authenticated, access is granted, or the user's initiated action is approved in response to inputting the code via another application accessed on another device and validating the code sent to the server, and wherein the data displayed includes an indication that the user is authenticated, the access is granted, or the user's initiated action is approved in response to inputting the code via the other application accessed on the other device and validating the code sent to the server.

12. A system for securely storing and processing inputs provided to an application, the system comprising:
a computer system that comprises one or more physical processors programmed with computer program instructions that, when executed, cause the computer system to:
obtain input data via a user interface of an authentication application accessed on a mobile device;
store the input data in a physical memory area of temporary storage of the mobile device, the physical memory area of the temporary storage being configured to be designated for securely storing only data processed by the authentication application and to remain designated for securely storing only data processed by the authentication application when the mobile device is rebooted, the physical memory area being inaccessible to other applications executing on the mobile device; and
process the input data via the physical memory area of the temporary storage in accordance with instructions of the authentication application.

13. The system of claim 12, further comprising:
in response to a reboot of the mobile device, reapply the designation of the physical memory area of the temporary storage to securely store data processed by the authentication application.

14. The system of claim 12, wherein the input data is processed by at least one processor designated to execute the authentication application, the at least one processor being inaccessible to the other applications executing on the mobile device.

15. The system of claim 12, further comprising:
randomly generate a keyboard layout;
display the keyboard layout via the user interface of the authentication application; and
obtain the input data via the keyboard layout.

16. The system of claim 12, further comprising:
store a plurality of keyboard layouts in the physical memory area of temporary storage of the mobile device;
select a keyboard layout from the plurality of keyboard layouts;
display the selected keyboard layout via the user interface of the authentication application; and
obtain the input data via the selected keyboard layout.

17. The system of claim 12, further comprising:
compare the input data to credential data stored in another memory area different from the physical memory area;
generate, by the authentication application, a code in response to a determination that the input data matches the credential data;
send the code to a server; and
display data via the user interface of the authentication application, wherein a user is authenticated, access is granted, or the user's initiated action is approved in response to a proper validation of the code sent to the server, and wherein the data displayed includes an indication that the user is authenticated, the access is granted, or the user's initiated action is approved in response to the proper validation of the code sent to the server.

18. The system of claim 12, further comprising:
compare the input data to credential data stored in another memory area different from the physical memory area;
generate, by the authentication application, a code in response to a determination that the input data matches the credential data;
display the code via the user interface of the authentication application; and display data via the user interface of the authentication application, wherein a user is authenticated, access is granted, or the user's initiated action is approved in response to inputting the code via another application accessed on another device and validating the code sent to a server, and wherein the data displayed includes an indication that the user is authenticated, the access is granted, or the user's initiated action is approved in response to inputting the code via another application accessed on another device and validating the code sent to the server.

19. The system of claim 17, wherein comparing the input data to the credential data includes comparing the cryptographic hash of the input data to cryptographic hashes of the credential data.

20. One or more non-transitory computer readable media storing computer program instructions that, when executed by a computer system, cause the computer system to perform operations comprising:
obtaining input data via a user interface of an authentication application accessed on a mobile device;
storing the input data in a physical memory area of temporary storage of the mobile device, the physical memory area of the temporary storage being configured to be designated for securely storing only data processed by the authentication application and to remain designated for securely storing only data processed by the authentication application when the mobile device is rebooted, the physical memory area being inaccessible to other applications executing on the mobile device; and
processing the input data via the physical memory area of the temporary storage in accordance with instructions of the authentication application.

\* \* \* \* \*